US012741480B2

(12) United States Patent
Kokozidis

(10) Patent No.: US 12,741,480 B2
(45) Date of Patent: Sep. 22, 2026

(54) GRIP FOR A WRITING IMPLEMENT

(71) Applicant: BIC Violex Single Member S.A., Anoixi (GR)

(72) Inventor: Michail Kokozidis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 169 days.

(21) Appl. No.: 18/832,767

(22) PCT Filed: Jan. 24, 2023

(86) PCT No.: PCT/EP2023/051674
§ 371 (c)(1),
(2) Date: Jul. 24, 2024

(87) PCT Pub. No.: WO2023/144139
PCT Pub. Date: Aug. 3, 2023

(65) Prior Publication Data

US 2025/0100318 A1 Mar. 27, 2025

(30) Foreign Application Priority Data

Jan. 31, 2022 (EP) .................................... 22154263

(51) Int. Cl.
*B43K 23/008* (2006.01)
*A45D 34/02* (2006.01)
(Continued)

(52) U.S. Cl.
CPC ............ *B43K 23/008* (2013.01); *A45D 34/02* (2013.01); *B05B 11/007* (2013.01); *B43K 29/00* (2013.01)

(58) Field of Classification Search
CPC ......... B43K 23/008; B43K 29/00; A61L 9/04; A61L 9/12; A61L 9/127; A45D 34/02;
(Continued)

(56) References Cited

U.S. PATENT DOCUMENTS 3,888,416 A 6/1975 Lin
4,200,229 A * 4/1980 Spector ............... B05B 11/1001 239/289
(Continued)

FOREIGN PATENT DOCUMENTS

CN 206217432 U 6/2017
CN 212555588 U 2/2021
(Continued)

OTHER PUBLICATIONS

Search Report and Written Opinion issued in International Application No. PCT/EP2023/051674, issued Mar. 17, 2023.

*Primary Examiner* — Darren W Gorman
(74) *Attorney, Agent, or Firm* — Bookoff McAndrews, PLLC

(57) ABSTRACT

A grip for use with a writing implement, wherein the grip includes a liquid reservoir including a volatile liquid, a user actuator configured to pressurize the volatile liquid in the liquid reservoir based on a force applied by a user of the grip, a liquid transfer member including at least one channel configured to provide a liquid transfer path out of the liquid reservoir; and a fragrance diffusion member in fluidic communication with the at least one channel, wherein, in use, an amount of volatile liquid is delivered to the fragrance diffusion member via the at least one channel in response to the user applying a force to the user actuator, wherein the grip is configured to release an aroma upon evaporation of the volatile liquid from the fragrance diffusion member.

20 Claims, 6 Drawing Sheets

(51) Int. Cl.
*B05B 11/00* (2023.01)
*B43K 29/00* (2006.01)

(58) Field of Classification Search
CPC ....... B05B 11/007; B05B 11/02; B05B 11/04; Y10S 261/88
USPC ............................................ 239/44, 47, 51.5
See application file for complete search history.

(56) References Cited

U.S. PATENT DOCUMENTS

| | | | | |
|---|---|---|---|---|
| 4,244,525 | A | 1/1981 | Manna | |
| 4,609,245 | A * | 9/1986 | Sakschek | A01M 31/008 401/199 |
| 6,945,473 | B2 * | 9/2005 | Garcia | A61L 9/12 239/326 |
| 2004/0028459 | A1 * | 2/2004 | Wetzel | B43K 5/005 401/209 |
| 2006/0157578 | A1 * | 7/2006 | Harada | A61L 9/12 239/34 |
| 2007/0020033 | A1 * | 1/2007 | Walsh | B43K 29/12 401/195 |
| 2015/0014428 | A1 * | 1/2015 | Rome | A61L 9/125 239/34 |
| 2015/0197118 | A1 * | 7/2015 | Wagenheim | B43K 24/06 29/428 |
| 2016/0368307 | A1 * | 12/2016 | Cote | B43K 23/016 |

FOREIGN PATENT DOCUMENTS

| | | | | |
|---|---|---|---|---|
| DE | 102009031244 | A1 | 1/2011 | |
| DE | 102009040622 | A1 | 3/2011 | |
| DE | 202011106209 | U1 | 12/2011 | |
| EP | 2211660 | B1 | 2/2019 | |
| JP | 2004181872 | A | 7/2004 | |
| JP | 2005007847 | A | 1/2005 | |
| JP | 2005014585 | A | 1/2005 | |
| JP | 3143995 | U | 8/2008 | |
| JP | 2009143106 | A | 7/2009 | |
| JP | 3184936 | U | 7/2013 | |
| KR | 200401648 | Y1 | 11/2005 | |
| KR | 200440216 | Y1 | 5/2008 | |
| KR | 20120064599 | A * | 6/2012 | B43K 29/20 |
| KR | 20150055709 | A * | 5/2015 | A45D 34/02 |

* cited by examiner

GRIP FOR A WRITING IMPLEMENT

CROSS-REFERENCE TO RELATED APPLICATIONS

This is a National Stage Application under 35 U.S.C. § 371 of International Application No. PCT/EP2023/051674, filed Jan. 24, 2023, now published as WO 2023/144139 A1, which claims priority to European Patent Application No. 22154263.2, filed on Jan. 31, 2022, the entireties of which are incorporated herein by reference.

TECHNICAL FIELD

The embodiments described concern a grip for use with a writing implement, a writing implement comprising the grip, a kit of parts, and a method of assembly.

BACKGROUND

A scented writing instrument emits an aroma, such as a coffee or perfume aroma. Scented writing instruments can be used for educational purposes, where an attractively scented pen can attract the interest of a child learning to write. Furthermore, scented writing instruments with a range of different scents enable the blind, or partially sighted, to distinguish between different pen types. Scented writing instruments have applications in aromatherapy, where scents enable a user to relax, or to instigate memories, or to stimulate creativity (dependent on the aromatherapy scent applied).

Conventional scented writing instruments typically comprise a body element which has the liquid scent impregnated into the body element, or permanently exposed to the atmosphere via a micro grille or hole. Scented writing instruments may, therefore, be further improved.

SUMMARY

According to a first aspect, there is provided a grip for use with a writing implement. The grip comprises a liquid reservoir comprising a volatile liquid, a user actuator configured to pressurize the volatile liquid in the liquid reservoir based on a force applied by a user of the grip, and a liquid transfer member comprising at least one channel configured to provide a liquid transfer path out of the liquid reservoir. The grip further comprises a fragrance diffusion member in fluidic communication with the at least one channel. In use, an amount of volatile liquid is delivered to the fragrance diffusion member via the at least one channel in response to the user applying a force to the user actuator, and the grip is configured to release an aroma upon evaporation of the volatile liquid from the fragrance diffusion member.

The release of an aroma from the grip, where the aroma has evaporated from the volatile liquid is, therefore, controllable. This contrasts with existing approaches, where the scent is emitted permanently, until all the volatile liquid has evaporated. For example, the scent is emitted only when the pen is used for writing, because the pressure exerted on the grip by a user when performing a writing operation also causes an emission of a proportion of the volatile liquid stored in the liquid reservoir. Therefore, the lifetime of the aroma emission function is improved. Furthermore, by positioning the user actuator on a part of the grip that is not actuated in usual use of the grip, the user can control the emission of aroma independently of when the grip is used.

The grips disclosed herein are also compatible with accepted packaging and distribution practices. When a grip, or a writing implement comprising the grip, is packaged, or held in a user's pencil case, it does not emit aroma, which could otherwise become distracting in storage cupboards or warehouses. The need for providing a hermetically sealed package is removed, thus simplifying and reducing cost and environmental impact of the packaging needed. If a plurality of grips are distributed in the same package, the cross-contamination of aromas (which may result in an unpleasant smell) from one grip to another is avoided. The need to provide a complicated internal seal inside the packaging between at least two pens having mutually different scents is removed.

The grip may be sold integrated with a writing implement, or as a retrofit option, enabling the grip to be used with a wide range of existing writing implements according to the user's choice. The integrated liquid reservoir, liquid channel, liquid transfer member, and fragrance diffusion member may be amenable to partial, or full, 3D printing. Therefore, the controlled release, and evaporation, of a volatile liquid in a fragrance emitting grip is enabled.

According to a second aspect, there is provided a writing implement comprising a writing implement body, and a permanent or removable grip according to the first aspect.

According to a third aspect, there is provided a method comprising assembling together at least (i) a liquid reservoir, (ii) a liquid transfer member comprising at least one channel configured to provide a liquid transfer path out of the liquid reservoir; and (iii) a fragrance diffusion member in fluidic communication with the at least one channel to provide a grip according to the first aspect or its embodiments, and filling the liquid reservoir with a volatile liquid.

According to a fourth aspect, there is provided a kit of parts, comprising a first grip according to the first aspect or its embodiments, wherein the liquid reservoir of the first grip comprises a first type of volatile liquid.

According to a fifth aspect, there is provided a grip according to the first aspect, or its embodiments. The liquid reservoir of the second grip comprises a second type of volatile liquid. The first grip and the second grip are hermetically packaged within a shared packaging envelope.

According to a sixth aspect, there are provided machine-readable program instructions capable of causing a 3D printing apparatus to manufacture the grip according to the first aspect, or its embodiments.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
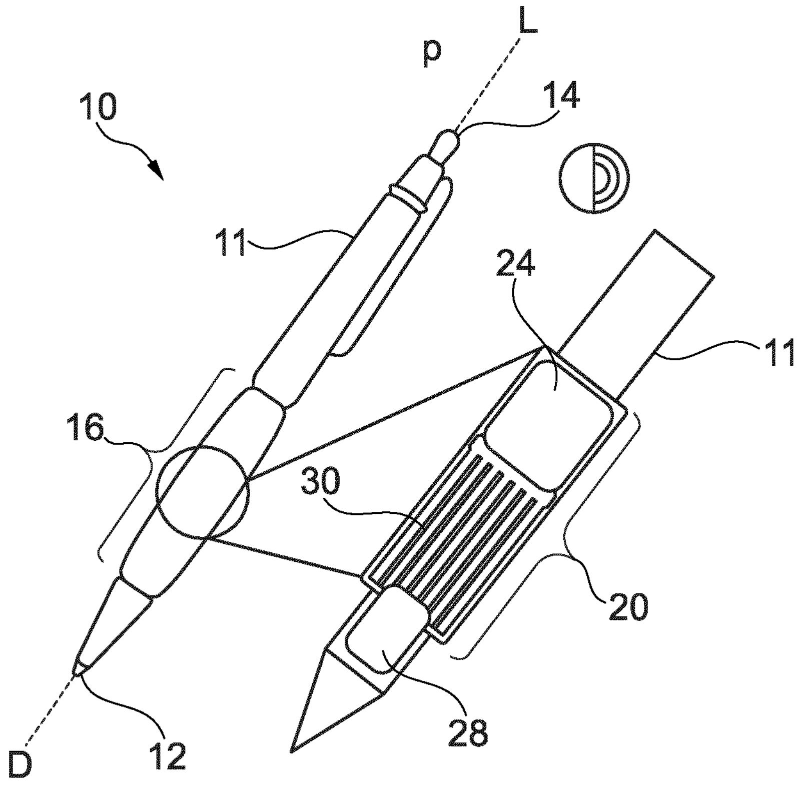
FIG. 1 schematically illustrates a writing implement comprising a grip.

FIG. 1 schematically illustrates a writing implement comprising a grip. The writing instrument 10 may be a pen, a pencil, an automatically propelling pencil, a wax crayon, a Biro™, a felt-tip pen, a fountain pen, a stylus for actuating an electronic device display, amongst others. In general, the writing implement 10 comprises a proximal end 14 and a distal end 12 defining longitudinal bounds of a writing implement body 11. The distal end 12 is, during writing, brought by a user into contact with a substrate such as writing paper or a touch-sensitive, or capacitive electronic device display. As such, the distal end 12 of the writing implement 10 may comprise a fountain pen nib, ballpoint, felt nib, pencil lead, and the like. The proximal end 14 of the writing implement comprises, for example, a cap or a button for propelling a Biro nib or pencil lead into, and out of, the distal end 12.

The writing implement 10 comprises a grip 16. The grip is, in examples, permanently attached to the body 11 of writing implement 10, or the grip 16 can be removably attached to the body 11 of writing implement 10 by sliding the grip 16 over the body 11 of writing implement 10 from either the proximal end 14 or the distal end 12 of the writing implement. For example, the grip 16 is retained in place on the body 11 of the writing implement 10 by a friction fit. In examples, the grip 16 is retained in place on the body 11 of the writing implement 10 by an adhesive. The grip 16 is configured to release an aroma upon evaporation of the volatile liquid from the fragrance diffusion member. In an example, the grip controllably releases an aroma based on the degree of actuation force applied to an actuator, such as a user actuator 24.

The grip 16 partially or fully encloses a substrate 20. In an example, substrate 20 contains and/or supports the liquid reservoir 22, user actuator 24, liquid transfer member 26, and fragrance diffusion member 28. In the illustrated example, substrate 20 is fabricated from materials suitable for defining microfluidic or macrofluidic channels for liquid transfer of the volatile liquid in the liquid reservoir 22 to the fragrance diffusion member 28.

Figure 2A:
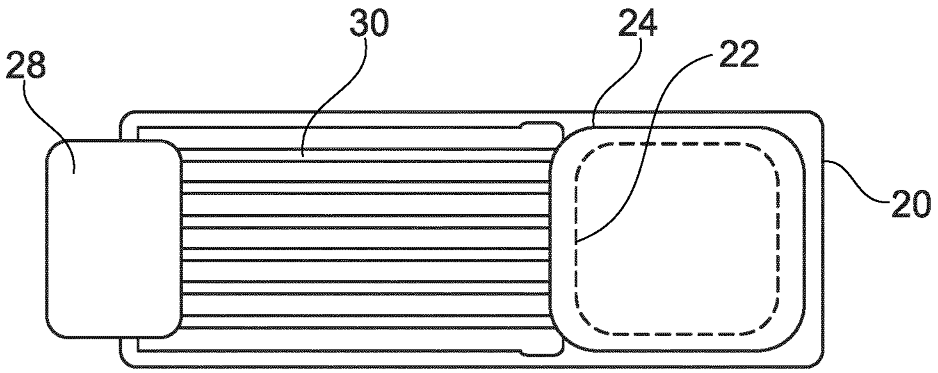
FIG. 2*a* schematically illustrates a cross-sectional plan view of a first example of an aroma diffuser.

FIG. 2*a* schematically illustrates a side view of a first example of an aroma diffuser.

Figure 2B:
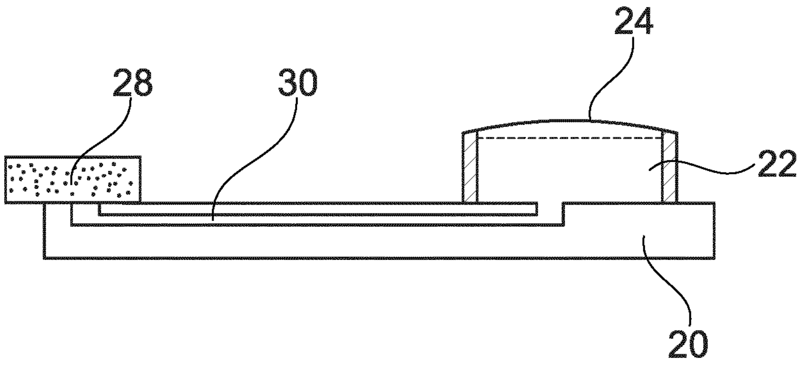
FIG. 2*b* schematically illustrates a cross sectional side view of the first example of the aroma diffuser.

FIG. 2*b* schematically illustrates a plan view of the first example of the aroma diffuser.

Figure 3A:
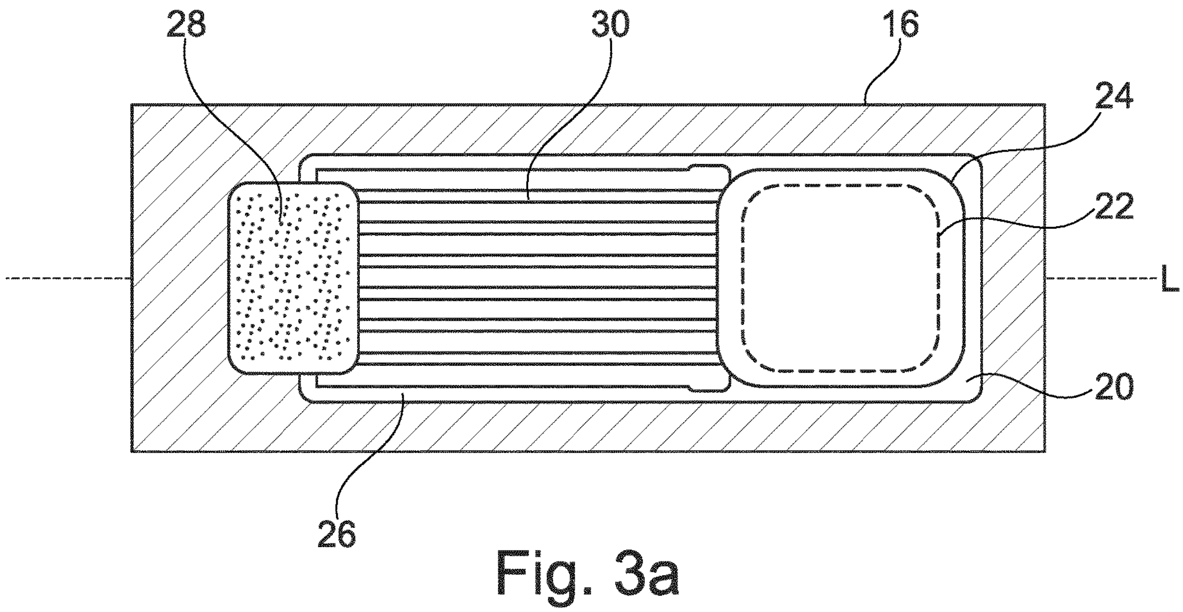
FIG. 3*a* schematically illustrates a plan view of the aroma diffuser of the first example when integrated into a grip for a writing implement.

FIG. 3*a* schematically illustrates a plan view of the aroma diffuser of the first example when integrated into a grip for a writing implement.

Figure 3B:
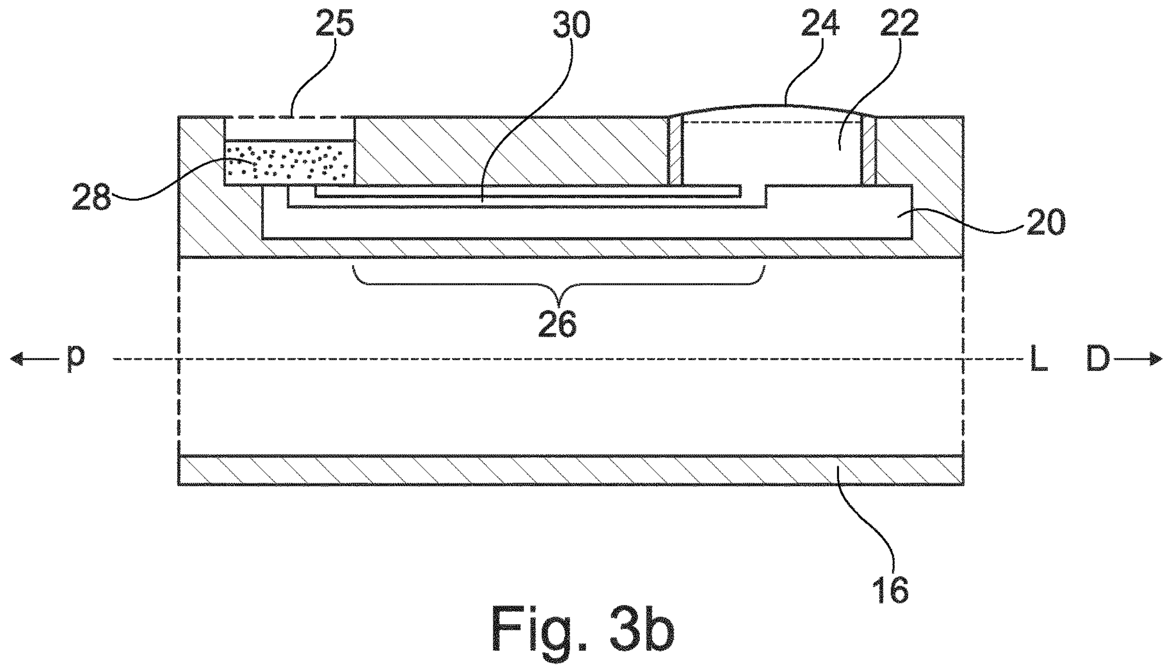
FIG. 3*b* schematically illustrates a cross-sectional side view of the aroma diffuser of the first example when integrated into a grip for a writing implement.

FIG. 3*b* schematically illustrates a side view of the aroma diffuser of the first example when integrated into a grip for a writing implement.

The grip 16 provides controlled release of an aroma carried by a volatile liquid comprised within the grip 16 according to a system to be described. In general, a volatile liquid is contained within the liquid reservoir 22. Upon evaporation from a fragrance diffusion member 28, the resulting aroma enables a user to distinguish a scent defined by the type of volatile liquid contained within the liquid reservoir 22. In an example, the volatile liquid comprises at least one Volatile Organic Compound (VOC)

According to a first aspect, there is provided a grip 16 for use with a writing implement 10. The grip comprises a liquid reservoir 22 comprising a volatile liquid, a user actuator 24 configured to pressurize the volatile liquid in the liquid reservoir based on a force applied by a user of the grip, a liquid transfer member 26 comprising at least one channel 30 configured to provide a liquid transfer path out of the liquid reservoir, and a fragrance diffusion member 28 in fluidic communication with the at least one channel.

In use, an amount of volatile liquid is delivered to the fragrance diffusion member via the at least one channel in response to the user applying a force to the user actuator. The grip 16 is configured to release an aroma upon evaporation of the volatile liquid from the fragrance diffusion member 28.

According to an embodiment the liquid reservoir 22 is located partially, or fully, coincident with an axis of movement of the button.

In the example of FIGS. 2*a* and 2*b*, a substrate 20 providing support for the functional elements of the fragrance diffuser is illustrated. FIGS. 2*a* and 2*b* do not illustrate the grip 16. In an example, substrate 20 is manufactured as a subassembly of the grip 16, and subsequently integrated into the grip 16. In an example, substrate 20 may be integrally formed with the grip, for example through injection moulding or 3D printing when manufacturing the grip 16.

In an example, the substrate 20 is formed from an elastomer enabling the formation of valves for liquid control. In an example, the substrate is formed from the elastomer General Electric Silicones RTV 615.

According to an embodiment, the liquid reservoir 22 is a bladder containing at least a portion of the volatile liquid, wherein the bladder is compressible during use of the grip by a user, and the user actuator is any portion of the surface of the bladder.

The liquid reservoir 22, at least one channel 30, and the fragrance diffusion member 28 are in fluidic communication with each other. A user actuator 24 is coincident to the liquid reservoir 22. As shown in FIG. 2*b*, the liquid reservoir comprises, in an example, a resilient actuation surface in the form of a bubble or bladder pressurised by a volatile liquid stored in the liquid reservoir 22. In this case, the resilient actuation surface of the liquid reservoir 22 also functions as the user actuator 24. In this case, the grip 16 may be provided with a hole enabling the resilient actuation surface of the liquid reservoir 22 In examples, a separate resilient button (for example, formed in the grip 16) that is configured, in use, to actuate the resilient actuation surface of the liquid reservoir 22 is provided.

Additionally or alternatively, the grip 16 may comprise a resilient material, and the liquid reservoir 22 is formed integrally in the grip 16. Pressure exerted on the grip 16 in normal use of an associated writing implement will, therefore, be transferred through the resilient material of the grip 16 to a liquid reservoir 22 formed integrally in the grip 16, in turn pressurising a volatile liquid stored in the liquid reservoir 22. In this example, at least one channel 30 provides a fluidic or microfluidic connection away from the integrally formed liquid reservoir 22 and towards a fragrance diffusion member 28.

The liquid transfer member 26 comprises at least one channel 30 (in examples, one channel 30 or a plurality of channels 30) provide a fluidic connection between the liquid reservoir 22 and the fragrance diffusion member 28. In an example, the at least one channel is a lumen integrally formed in the material of substrate 20. In examples (not illustrated), the substrate 20 may be formed from at least two conjoined layers, with the at least one channel formed in a first layer, and a second layer being adhesively attached so as to sealably cover the first layer. In an example, the substrate 20, and thus the at least one channel 30, are 3D printed. In an example, the substrate 20, and thus the at least one channel 30, are injection moulded. In an example, the substrate 20, and thus the at least one channel 30 is integrally formed with the grip 16.

According to an embodiment, the at least one channel 30 comprised in the liquid transfer member 26 is one, or more microfluidic channels. According to an embodiment, the at least one channel 30 comprised in the liquid transfer member 26 is a microfluidic channel. A microfluidic channel is, for the purposes of this specification, considered to be a channel in which the volatile liquid experiences liquid flow characterised by a relatively low Reynolds' number when flowing through the liquid transfer member 26.

In an example, assuming that the volatile liquid has a viscosity broadly comparable to water, the width of the at least one channel 30 is greater than 1 μm and less than one millimetre along substantially the entire length of the liquid transfer member 26.

The use of microfluidic channels in the liquid transfer member can provide fine control over the delivery of volatile liquid to the fragrance diffusion member 28. In an example, a valve and/or pump for controlling flow of the volatile liquid to the fragrance diffusion member 28 is not required, because the microfluidic channels comprised in the liquid transfer member present a degree of flow resistance to the volatile liquid preventing uncontrolled discharge into the fragrance diffusion member 28.

In examples, the at least one channel 30 comprised in the liquid transfer member is a macrofluidic channel. The at least one channel 30 in this case has a width greater than 1 mm, or greater than 2 mm, and limited in practice by the dimensions of the grip 16.

According to an embodiment, the fragrance diffusion member 28 is configured to absorb the volatile liquid transferred from the at least one channel 30, and to release the aroma from the grip in gaseous form.

The fragrance diffusion member 28 comprises, in an example, a substantially porous material in fluidic communication with at least one liquid flow channel 30. For example, the fragrance diffusion member 28 enables capillary action between the output of the at least one liquid flow channel 30 and an external face of the fragrance diffusion member 28 exposed to ambient air. The illustrated shape of the fragrance diffusion member 28 is indicative, and the fragrance diffusion member 28 may be provided in a conical, cylindrical form, or any other arbitrary form required to fit to specific type of writing implement 10 and/or grip 16 shape. In an example, the fragrance diffusion member 28 comprises porous polymeric fibre.

In an example, the fragrance diffusion member 28 comprises the polyester PE (polyethylene), PP (polypropylene), PET (polyethylene terephthalate), or PBT (polybutylene terephthalate). In an example, the fragrance diffusion member 28 comprises a ceramic or metal foam, or a cotton wick. In an example, a non-diffusing portion of the fragrance diffusion member 28 is treated to prevent leakage of the volatile liquid to undesired portions of the grip 16. For example, such treatment of the fragrance diffusion member 28 comprises a heat treatment applied to the non-diffusing portion of the fragrance diffusion member 28, or a non-permeable wrap applied to the non-diffusing portion of the fragrance diffusion member 28.

In an example, the fragrance diffusion member 28 has a density in the range of 0.30-0.40 g/cm$^3$. In an example, the fragrance diffusion member 28 comprises pores with micron sizes in the range 25-125 μm.

In an example, the grip 16 comprises a mesh element 25 (formed, for example, integrally with an elastomeric or polymeric material of the grip 16). The mesh element 25 is aligned coincidentally with the liquid diffusion member 28, to provide a protective barrier preventing the material of the fragrance diffusion member 28 from becoming blocked or damaged.

In an example, the fragrance diffusion member 28 is 3D printed as a porous structure and is integrally formed with the substrate 20 and/or the grip 16.

In an example, the liquid reservoir 22 and/or the at least one channel 30 are pre-filled with a volatile liquid prior to encapsulation within the grip 16. A wide range of volatile liquids comprising aromas may be pre-filled. In an example, the liquid reservoir 22 comprises a port (not shown) to enable external refilling of the liquid reservoir 22 by a rigid lumen, for example.

Turning to FIG. 3*b*, in use, the user initially fits the grip 16 to a writing implement 10. The user holds the writing implement 10 in a standard way for writing. Deliberately, or coincidentally, the user exerts a force on the user actuator 24 (or a pressure plate coupled to the user actuator) towards the longitudinal axis of the writing implement and/or grip 16. This can be achieved during normal writing operation, or as a deliberate user choice for example. The pressure on the volatile liquid stored in the liquid reservoir 22 therefore increases, causing flow of the volatile liquid through at least one channel 30 of the liquid transfer member 26. A proportion of volatile liquid is wicked through the fragrance diffusion member 28, and evaporates as a fragrance. In the system illustrated in FIGS. 2 and 3, the bladder-portion of the liquid reservoir 22 gradually deflates, and becomes concave, as the volatile liquid empties from the liquid reservoir 22. Accordingly, in this example, a positive displacement pumping action is provided by the bladder portion of the liquid reservoir 22, and valves regulating the egress of liquid from the liquid transfer member 26 into the fragrance diffusion member 28 are not required, because capillary resistance provided by the at least one channel 30 of the liquid transfer member 26 serves to confine the volatile liquid within the liquid transfer member 26 until a further positive displacement action on the user actuator 24 of the liquid reservoir 22.

Variations will now be discussed.

Figure 4:
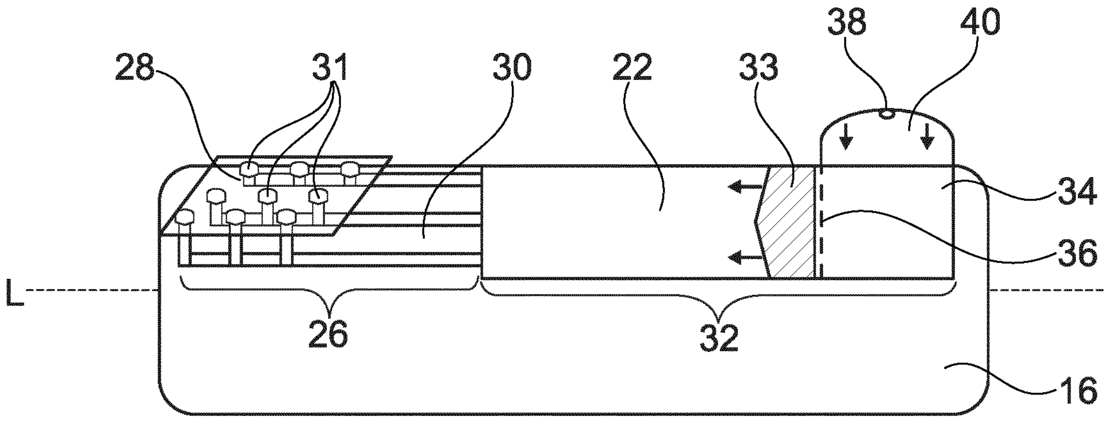
FIG. 4 schematically illustrates a side view of a second example of an aroma diffuser.

FIG. 4 schematically illustrates a side view of another embodiment of an aroma diffuser.

In the grip embodiment of FIG. 4, the interface of each channel of the liquid transfer member 26 with the aroma diffusion member 28 is provided with one or more valves 31. The valves seal the channels of the liquid transfer member 26 from the aroma diffusion member 28. Upon application of positive pressure to the volatile liquid contained in the liquid transfer member 26, the valves enable the passage of volatile liquid into the aroma diffusion member 28. When the positive pressure is removed from the volatile liquid, the one or more valves 31 re-seal themselves.

In embodiments, the liquid reservoir 22 and/or the liquid transfer member 26 are partially, or fully enclosed in a substantially non-deformable substrate 20, and the user actuator 24 is a button 40 disposed on a portion of, or adjacent to, the non-deformable substrate 20.

In embodiments, the grip further comprises at least one pump 32 configured to pump the volatile liquid from the liquid reservoir 22 to the fragrance diffusion member 28.

According to the embodiment illustrated in FIG. 4, the grip 16 is provided with a pump 32. The pump is configured to apply positive pressure to the volatile liquid based on user actuation via the button 40. The pump comprises a void 34, a hollow button 40, and a plunger 33 configured to move unidirectionally into the liquid reservoir 22 thus forming a positive displacement pump analogous to a syringe driver. The hollow button 40 is configured to move towards the longitudinal axis L of the grip 16. The hollow button 40 is, in an example, sprung to enable it to recoil when a user removes the finger from the button 40.

A liquid reservoir 22 contains a volatile liquid. The liquid reservoir 22 comprises rigid walls (comparable for example to a syringe), to provide a sealed guide for the plunger 33. The liquid reservoir 22 is in liquid communication with at least one channel 30 of a liquid transfer member 26. In this embodiment, the at least one channel 30 may be either a microfluidic or a macrofluidic channel, in common with the definition given previously.

In use, a user presses the hollow button 40 down whilst covering the air hole 38. The volume of the void 34 is, thereby, reduced, thus increasing compression of the air remaining in the void 34. This, in turn, causes the plunger 33 to travel along the liquid reservoir 22 by an increment of distance, thus inducing positive pressure in the volatile liquid and forcing a portion of volatile liquid through the at least one channel 30 of the liquid transfer member 26, and into the fragrance diffusion member 28. For example, the increment of distance that the plunger 33 moves is proportional to the volume of the liquid displaced when the button 40 is pressed.

In an example, at least one valve may be provided at the interface between the at least one channel and the fragrance diffusion member 28. The user relaxes the force on the button 40 and removes their finger from the air hole 38, thus enabling the button to recoil (for example, using a spring). Repeated actuations of the button 40 lead to additional displacements of the plunger 33 until the liquid reservoir 22 is depleted of volatile liquid. A limiting member 36 is, for example, provided to ensure that the plunger 33 is not displaced into the void 34.

Therefore, the positive displacement pump in combination with the user actuator (button) in the embodiment illustrated in FIG. 4 enables reliable control of the dosage per actuation of the user actuator. Other variations of the embodiment of FIG. 4 are possible. For example, the air hole 38 is replaced with a membrane valve.

A further example of a pump may be a 3D printable microvalve comprising three Quake valves in series, enabling a peristaltic pumping action to be provided. Therefore, liquid can be transferred from the liquid reservoir to the fragrance diffusion element 28 using at least three Quake valves in series.

According to an embodiment, the liquid reservoir 22 further comprises a refill port, to enable replenishment of the volatile liquid.

In a refillable variation of the embodiment of FIG. 4, a lumen entry valve is provided at the side of the liquid reservoir 22 nearest to the liquid transfer member, so that refilled volatile liquid causes the plunger 33 to be restored to its starting position.

According to an embodiment, the grip further comprises at least one valve 31 disposed between the at least one channel 30 and the fragrance diffusion member 28, wherein the at least one valve is configured to control the flow of volatile liquid between the at least one channel and the fragrance diffusion member.

According to an embodiment, the valve is disposed between the liquid reservoir 22 and the at least one channel.

According to an embodiment, the at least one valve 31 is a Quake valve, a flap valve, a membrane valve, a cusp valve, or a ball microvalve.

Figure 5:
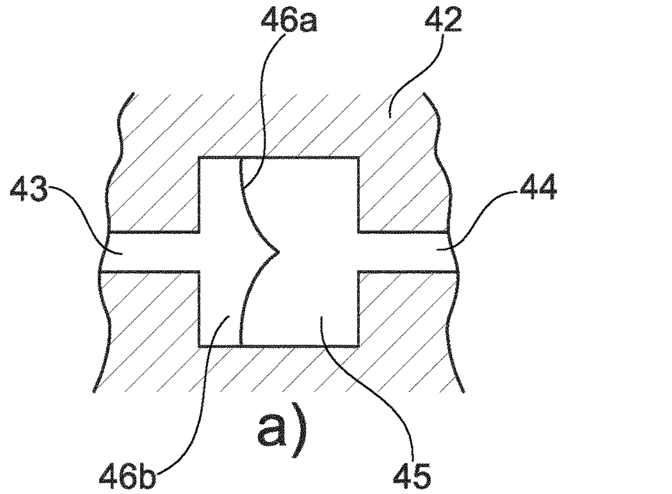
FIG. 5 schematically illustrates a cross-section view of a first example of a microfluidic valve.

FIG. 5 schematically illustrates a cross-section view of a first example of a microfluidic valve. For example, a valve confinement 42 is formed from a portion of the grip 16 or substrate 20. The volatile liquid enters the valve via valve inlet 43 and exits the valve via valve outlet 44. The first example of a microfluidic valve comprises a valve void 45 comprising a plurality of valve cusps 46*a*, 46*b*. The plurality of valve cusps 46*a*, 46*b* are closed when the liquid pressure at the valve inlet 43 and the valve outlet 44 are substantially comparable, or when the liquid pressure at the valve outlet 44 exceeds the liquid pressure at the valve inlet 43. Upon the exertion of positive pressure on the valve cusps 46*a*, 46*b* by a liquid at the valve inlet 43, the valve cusps 46*a*, 46*b* burst open and permit the passage of volatile liquid to the valve outlet (and subsequently to the fragrance diffusion member 28). Upon relaxation of the positive pressure on the valve cusps 46*a*, 46*b*, the valve cusps 46*a*, 46*b* close and seal the channels 30 of the liquid transfer member 26.

Figure 6:
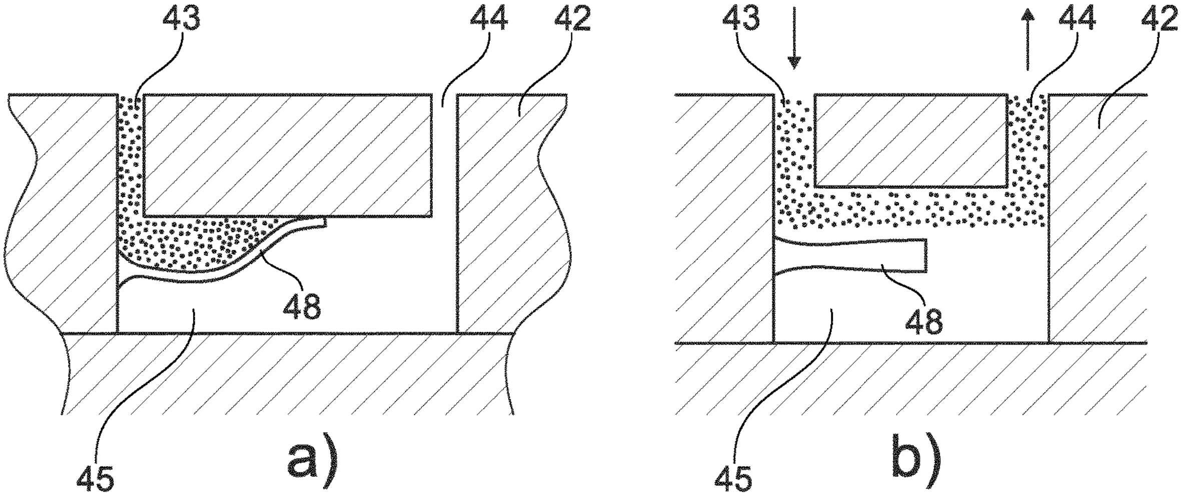
FIG. 6 schematically illustrates a cross-sectional view of a second example of a microfluidic valve.

FIG. 6 schematically illustrates a cross-sectional view of a second example of a microfluidic valve (a flap valve). For example, a valve confinement 42 is formed from a portion of the grip 16 or substrate 20. A valve void 45 encloses a valve tongue 48. When the second example of the microfluidic valve experiences a positive pressure applied via the valve inlet 43, the valve tongue 48 is forced open (as shown in FIG. 6*b*)), enabling the volatile liquid to flow to the value outlet 44. When the pressure applied to the volatile liquid is removed, the valve tongue seals the valve.

The foregoing description provides examples of valves that can be used to seal the interface between the liquid transfer member 26 and the fragrance diffusion member 28. In an example, a Quake valve may be used. A Quake valve uses a separately pressurised control channel to constrict or relax an obstruction in a portion of microfluidic channel. An aspect of using a valve to seal the interface between the liquid transfer member 26 and the fragrance diffusion member 28 is to prevent unintentional discharges, or evaporation, of the volatile liquid from the liquid transfer member 26.

According to an embodiment, the liquid transfer member 26 further comprises an actuation channel configured to be actuatable by the user actuator. The actuation channel is in fluidic communication with at least one control channel of the at least one valve 31. The actuation channel is not in fluidic communication with the liquid reservoir 22.

For example, a compressible elastomeric grip 16 comprises two compressible bladders that are fluidically independent. The first bladder functions as the liquid reservoir 22 and stores a volatile liquid. The second bladder (not illustrated) contains another liquid, or a gas, capable of controlling a control channel of one or more valves. When the compressible elastomeric grip 16 is manipulated or squeezed by a user, the pressure in both bladders increases in unison. The liquid or gas from the second bladder actuates the control channel of at least one valve 31, enabling the volatile liquid to leave the channels of the liquid transfer member 26 and to enter the fragrance diffusion member 28. Because the second bladder (actuation channel) is not in fluidic communication with the liquid reservoir 22, the controllability of the at least one valve 31 is not affected as the amount of volatile liquid depletes from the first bladder (liquid reservoir 22), thus enabling finer control of the fragrance release even at low fill levels of the liquid reservoir 22.

According to a second aspect, there is provided a writing implement 10, comprising a writing implement body 11 and a permanent or removable grip 16 according to the first aspect, or its embodiments. The writing instrument 10 may be a pen, a pencil, an automatically propelling pencil, a wax crayon, a Biro™, a felt-tip pen, a fountain pen, a stylus for actuating an electronic device display, amongst others.

Figure 7:
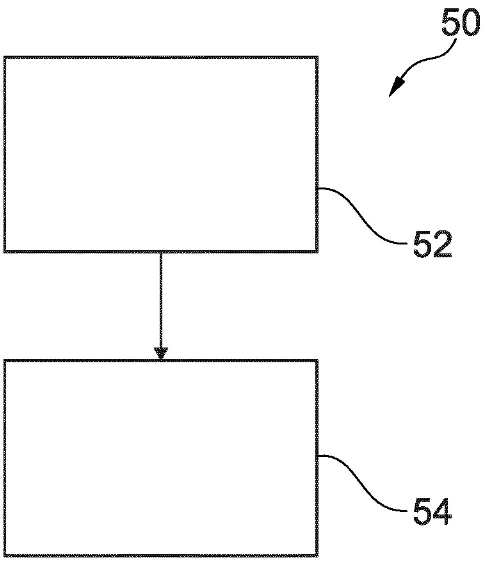
FIG. 7 schematically illustrates a method according to the third aspect.

FIG. 7 schematically illustrates a method according to the third aspect.

According to a third aspect, there is provided a method 50 of manufacturing a grip 16 for use with a writing implement, comprising:

- assembling, or 3D printing, at least (i) a liquid reservoir 22, (ii) a liquid transfer member 26 comprising at least one channel 30 configured to provide a liquid transfer path out of the liquid reservoir 22; and (iii) a fragrance diffusion member 28 in fluidic communication with the at least one channel 30 to provide a grip for a writing implement 10; and
- filling 54 the liquid reservoir with a volatile liquid.

According to a fourth aspect, there is provided a kit of parts, comprising a first grip 16 according to the first aspect, or its embodiments, wherein the liquid reservoir 22 of the first grip 16 comprises a first type of volatile liquid.

According to a fifth aspect, there is provided a kit of parts comprising a second grip according to the first aspect, or its embodiments, wherein the liquid reservoir of the second grip comprises a second type of volatile liquid; and wherein the first grip and the second grip are hermetically packaged within a shared packaging envelope.

According to a sixth aspect, there are provided machine-readable program instructions capable of causing a 3D printing apparatus to manufacture the grip according to the first aspect, or its embodiments.

References throughout the preceding specification to "one embodiment", "an embodiment", "one example" or "an example", "one aspect" or "an aspect" means that a particular feature, structure, or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

REFERENCE NUMERALS

10 Writing Implement
11 Writing implement body
12 Proximal end of writing implement
14 Distal end of writing implement
16 Grip
20 substrate
22 liquid reservoir
24 user actuator
25 mesh
26 liquid transfer member
28 fragrance diffusion member
30 channel
31 valve
32 pump
33 plunger
34 void
36 limiting member
38 air hole
40 button
42 valve confinement
43 valve inlet
44 valve outlet
45 valve void
46*a, b* valve cusps
48 valve tongue
50 method
52 assembling or 3D printing
54 filling with liquid

The invention claimed is:

1. A grip for use with a writing implement, wherein the grip comprises:

- a liquid reservoir comprising a volatile liquid;
- a user actuator configured to pressurize the volatile liquid in the liquid reservoir based on a force applied by a user of the grip;
- a liquid transfer member comprising at least one channel configured to provide a liquid transfer path out of the liquid reservoir; and
- a fragrance diffusion member in liquid communication with the at least one channel;
- wherein, in use, an amount of volatile liquid is delivered to the fragrance diffusion member via the at least one channel in response to the user applying a force to the user actuator, and wherein the grip is configured to release an aroma upon evaporation of the volatile liquid from the fragrance diffusion member, wherein the liquid reservoir is a bladder containing at least a portion of the volatile liquid, wherein the bladder is compressible during use of the grip by a user, and the user actuator is a surface of the bladder, and wherein the grip is configured to be fitted around a body of a writing implement.

2. The grip according to claim 1,

- wherein the at least one channel comprised in the liquid transfer member is one, or more microfluidic channels.

3. The grip according to claim 1, comprising a resilient material and wherein the liquid reservoir is integrally formed in the grip.

4. The grip according to claim 1,

- wherein the liquid reservoir further comprises a refill port, to enable replenishment of the volatile liquid.

5. A method of manufacturing the grip according to claim 1, comprising:

- assembling, or 3D printing, at least (i) the liquid reservoir, (ii) the liquid transfer member, and (iii) the fragrance diffusion member; and
- filling the liquid reservoir with a volatile liquid.

6. The grip according to claim 1, wherein the grip defines an internal passage sized to receive a body of a writing implement.

7. The grip according to claim 1, wherein the grip defines an opening configured to slidably receive a body of a writing implement therein.

8. The grip according to claim 1, wherein the fragrance diffusion member comprises a porous material configured to absorb the volatile liquid and to release the aroma from the grip in gaseous form, wherein the fragrance diffusion member enables capillary action between an output of the at least one channel and an external face of the fragrance diffusion member exposed to ambient air.

9. The grip according to claim 1, wherein the grip is retained on a body of the writing implement by a friction fit or an adhesive.

10. The grip according to claim 1, further comprising a mesh element aligned coincidentally with the fragrance diffusion member, wherein the mesh element provides a protective barrier preventing the fragrance diffusion member from becoming blocked or damaged.

11. A writing implement, comprising:

a writing implement body, and a permanent or removable grip configured to fit around a body of the writing implement, wherein the grip comprises:

a liquid reservoir comprising a volatile liquid;

a user actuator configured to pressurize the volatile liquid in the liquid reservoir based on a force applied by a user of the grip;

a liquid transfer member comprising at least one channel configured to provide a liquid transfer path out of the liquid reservoir; and a fragrance diffusion member in liquid communication with the at least one channel;

wherein, in use, an amount of volatile liquid is delivered to the fragrance diffusion member via the at least one channel in response to the user applying a force to the user actuator, and wherein the grip is configured to release an aroma upon evaporation of the volatile liquid from the fragrance diffusion member.

12. The writing implement according to claim 11, further comprising:

at least one valve disposed between the at least one channel and the fragrance diffusion member, wherein the at least one valve is configured to control a flow of volatile liquid between the at least one channel and the fragrance diffusion member.

13. The writing implement according to claim 12, wherein the at least one valve is a Quake valve, a flap valve, a membrane valve, a cusp valve, or a ball microvalve.

14. The writing implement according to claim 12, wherein the liquid transfer member further comprises an actuation channel configured to be actuatable by the user actuator, wherein the actuation channel is in liquid communication with at least one control channel of the at least one valve, and wherein the actuation channel is not in liquid communication with the liquid reservoir.

15. The writing implement according to claim 11, further comprising:

at least one pump configured to pump the volatile liquid from the liquid reservoir to the fragrance diffusion member.

16. The writing implement according to claim 11, wherein the liquid reservoir and/or the liquid transfer member are partially, or fully enclosed in a substantially non-deformable substrate, and the user actuator is a button disposed on a portion of, or adjacent to, the non-deformable substrate.

17. The writing implement according to claim 16, wherein the at least one channel is a lumen integrally formed in the substrate.

18. The writing implement according to claim 17, wherein the liquid reservoir is located partially, or fully, coincident with an axis of movement of the button.

19. A kit of parts, comprising:

a first grip configured to be fitted around a body of a writing implement, wherein the first grip comprises:

a first liquid reservoir comprising a first type of volatile liquid, wherein the first liquid reservoir is a first bladder containing at least a portion of the first type of volatile liquid, wherein the first bladder is compressible during use of the first grip by a user;

a first user actuator configured to pressurize the first type of volatile liquid in the first liquid reservoir based on a force applied by a user of the first grip, wherein the first user actuator is a surface of the first bladder;

a first liquid transfer member comprising at least one first channel configured to provide a liquid transfer path out of the first liquid reservoir;

a first fragrance diffusion member in liquid communication with the at least one first channel; and a writing implement, wherein, in use, an amount of volatile liquid is delivered to the first fragrance diffusion member via the at least one first channel in response to the user applying a force to the first user actuator, and wherein the first grip is configured to release an aroma upon evaporation of the first type of volatile liquid from the first fragrance diffusion member.

20. The kit of parts according to claim 19, further comprising:

a second grip configured to be fitted around a body of the writing implement, wherein the second grip comprises:

a second liquid reservoir comprising a second type of volatile liquid, wherein the second liquid reservoir is a second bladder containing at least a portion of the second type of volatile liquid, wherein the second bladder is compressible during use of the second grip by a user;

a second user actuator configured to pressurize the second type of volatile liquid in the second liquid reservoir based on a force applied by a user of the second grip, wherein the second user actuator is a surface of the second bladder;

a second liquid transfer member comprising at least one second channel configured to provide a liquid transfer path out of the second liquid reservoir;

a second fragrance diffusion member in liquid communication with the at least one second channel;

wherein the first grip and the second grip are packaged within a shared packaging envelope.

* * * * *